June 24, 1969   H. KIEFER   3,451,095

CUSHIONED ROLLER

Filed July 17, 1967

INVENTOR.
Henry Kiefer
Wood, Herron & Evans
ATTORNEYS

United States Patent Office 3,451,095
Patented June 24, 1969

3,451,095
CUSHIONED ROLLER
Henry Kiefer, Plainsville, Ohio, assignor to Eagle-Picher Industries, Inc., Cincinnati, Ohio, a corporation of Ohio
Filed July 17, 1967, Ser. No. 653,853
Int. Cl. E05d *13/02*
U.S. Cl. 16—107                10 Claims

ABSTRACT OF THE DISCLOSURE

A roller comprising a tread portion, a hub portion, and a disc portion between the tread and the hub portions, the disc portion being substantially solid and having at least one groove disposed inwardly from each side of the disc and extending parallel to the axis of the roller past the midplane of the roller but not extending to the opposite side of the disc.

---

This invention relates to caster type rollers or wheels and, in particular, relates to caster type rollers formed of plastic materials.

Caster type rollers are old and well known in the prior art. Such rollers have found numerous uses in industry, as well as in the home, in numerous types of application. For example, caster type rollers are often used, in combination with an overhead track, to hang vertical door panels in a manner that permits sliding movement of the panels relative one to the other. Typical door panel use illustrations include cupboard door panels found in the home and elevator door panels found in office buildings and the like.

Generally speaking, there are two primary objectives in forming caster type rollers. First of all, the roller must be durable to provide good wearability and a long useful life. In addition, the roller must provide a relatively soft ride. In practice, these two primary objectives, namely, good wearability and soft ride, have been found to be opposing factors in the manufacture of caster type rollers from plastic materials. It is known in the art that to provide a roller with good wearability and long useful life, the tread of the roller must be formed of a relatively dense material having a high hardness; the use of a dense and high hardness plastic, however, provides a caster type roller that gives a relatively hard ride. To provide a caster type roller that gives a soft ride, it is known in the art to use a material of lesser density and low hardness; the use of a soft plastic, on the other hand, gives a caster type roller with a relatively short useful life.

One roller structure that has been proposed for achieving the soft ride and long wearability objectives in the same roller, notwithstanding the factors inherent in plastic materials that tend to make such objectives incompatible, provides a tread of dense or relatively hard material for long wearability purposes, and a less dense or relatively soft disc portion for soft ride purposes. Of course, the disc portion of the roller must be fastened or adhered to the tread in some manner at an interface. Such a connection provides a weakness in the roller structure that may lead to problems during operational service of the wheel.

The roller structure of this invention obviates the problems described above of the prior art caster type roller. The roller structure of this invention basically includes a tread, a hub, and a disc portion between the tread and the hub, the disc portion being substantially solid and having at least one groove disposed inwardly from at least one side of the disc so as to provide a hinge effect or flexing action in use.

It has been an objective of this invention to provide a wheel structure for caster type wheels made of plastic material that provides both good wearability and soft ride characteristics.

It has been another objective of this invention to provide a caster type wheel of plastic material wherein the wheel tread and disc portions are integrally molded one with the other.

Other objectives and advantages of this invention will be more apparent from the following detailed description taken in conjunction with the drawings in which.

Figure 1:
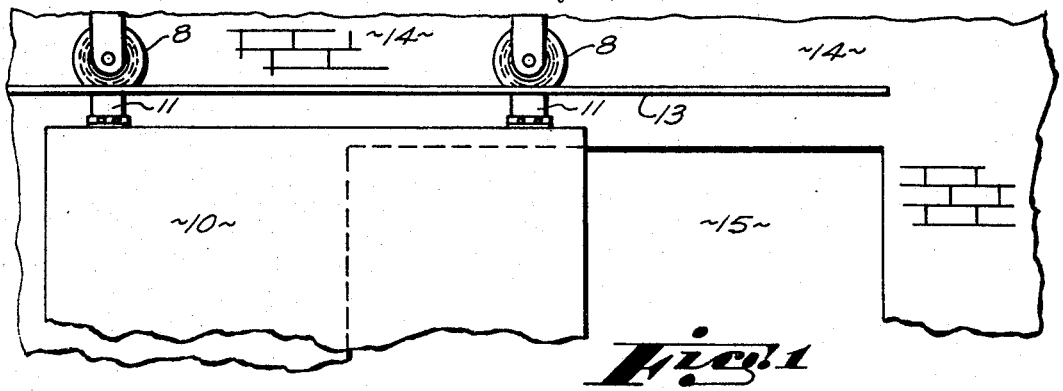
FIGURE 1 is a partially cut away side view of a vertical door panel suspended from an overhead track by caster rollers in accordance with a preferred form of this invention.

Referring to FIGURE 1, caster type rollers 8 of this invention are shown in operating relationship with a vertical sliding door panel 10. The door panel 10 is provided with a plurality of roller mounting brackets 11, for example one at each end. The roller mounting bracket 11 has journalled to it the caster type roller 8 formed in accordance with this invention. The rollers 8 are adapted to ride along an overhead track 13 that is mounted to a suitable supporting structure, for example, wall 14, thereby supporting the door 10. Thus, the vertical door panel 10 can be moved between a first position whereat doorway 15 in the wall 14 is closed, and a second position whereat the doorway 15 in the wall 14 is open.

Figures 2, 3, 4:
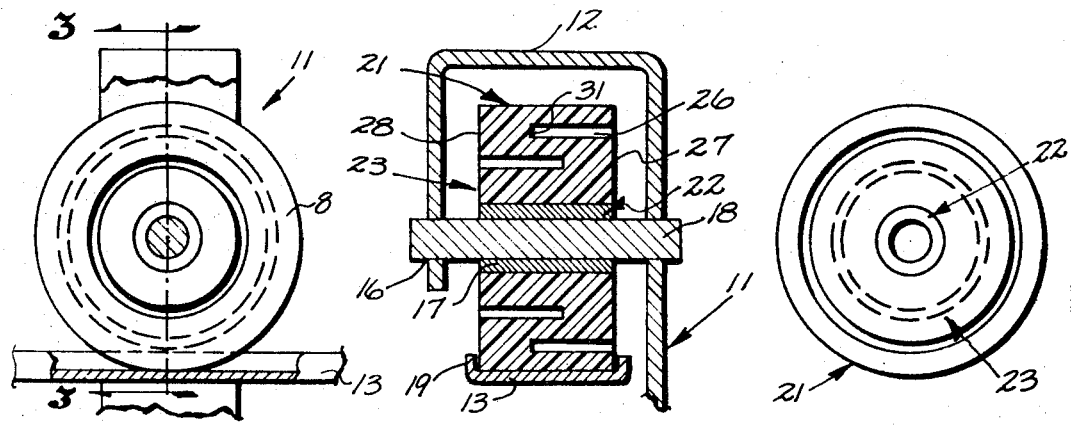
FIGURE 2 is an enlarged view illustrating one side of a roller assembly of the type shown in FIGURE 1.
FIGURE 3 is a cross sectional view taken along line 3—3 of FIGURE 2.
FIGURE 4 illustrates the side face of the roller which is opposite to that side shown in FIGURE 2.

FIGURES 2 and 3 show in greater detail a typical mounting bracket 11 which is useful with roller 8, and how the roller is carried by the mounting bracket and track 13. The bracket 11 is provided with an inverted U-shaped top section 12 that provides openings or bearing surfaces 16 adapted to receive an axle 18. The roller 8 may include an axial metal sleeve or bearing 17 by which it is rotatably journalled on axle 18. The periphery of roller 8 rides in the overhead track 13, the track being provided with upstanding side edges, 19, if desired, so as to guide the wheel along the track.

A preferred embodiment of the roller 8 of this invention, as illustrated in FIGURES 2-4, is in the form of a disc and includes a rounded peripheral tread portion 21, a central or axial hub portion 22, and a disc portion 23 disposed between the tread and the hub. It will be noted from a cross section view of the roller 8, see FIGURE 3, that the tread 21, hub 22, and disc 23 portions of the roller are molded integral one with the other so that no bonded interfaces, for example, between tread and disc portions, are required. If desired, the hub portion 22 of the roller 8 may be provided with a sleeve 17 to provide a better bearing surface for axle 18. It will be noted that the disc portion 23 of the caster type roller 8 is shown of substantially the same axial dimension as the tread 21. Although such a roller 8 geometry is not required, it is preferred.

Within the disc portion 23 of the roller 8 there is provided an annular groove 26 disposed inwardly from each side 27, 28, respectively, of the roller. It is preferred that the annular grooves 26 be continuous, as illustrated in FIGURES 2 and 4, and it is preferred that the grooves be circular in configuration. Also, it is preferred that the grooves 26, commencing from opposite sides 27, 28, be radially staggered relative to the central axis of the roller 8. For example, the groove 26 disposed inwardly from the side 28 of the roller 8, as illustrated in FIGURES 2–4, is positioned a lesser radial distance from the axis of the roller than is the groove 26 disposed inwardly from the side 27 of the roller. Such a staggered relationship of the grooves 26 permits ends 31 of the grooves to be formed in overlapping relationship within the disc portion 23 of the roller 8, which I have found to be especially desirable. Such a staggered annular groove 26 arrangement permits a hinge-like effect to be obtained when external radial loads are applied to the roller 8. This hinge effect not only serves to soften the ride of the roller 8 over, for example, track 13, but it also serves to absorb noise and vibrations generated by, for example, movement of the vertical door panel 10. In addition, such a staggered annular groove 26 geometry for the roller 8 tends to minimize the effect of compression set that normally occurs in a roller formed of plastic material after the roller has been standing idle under load conditions for an extended period of time.

Thus, through the "hinging" action of the grooves, the effective softness of the ride is established. Ride softeners can also be controlled by the shape, number, and depth of the grooves. Such groove geometry changes thus permit the variance of ride softness, depending on the roller's end product use, without need for varying the outer dimensions of the roller or plastic material composition, that is, at no sacrifice in softness of the material from which the roller is made.

Figures 5, 6, 7:
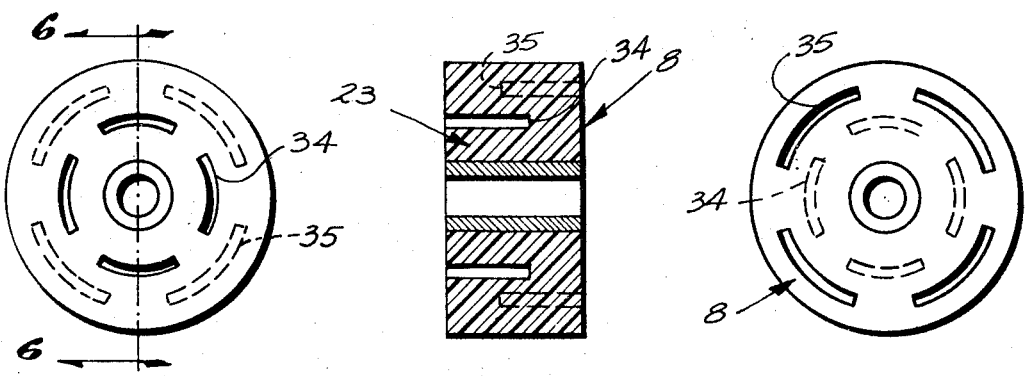
FIGURE 5 illustrates the side face of an alternative embodiment of the roller.
FIGURE 6 is a cross sectional view taken along line 6—6 of FIGURE 5.
FIGURE 7 illustrates the roller's side opposite to that side shown in FIGURE 5.

An alternative embodiment of the caster type roller 8 of this invention is illustrated in FIGURES 5–7. The primary difference between the roller embodiment illustrated in FIGURES 2–4 and the alternative embodiment illustrated in FIGURES 5–7 is that the alternative embodiment is provided with segmented grooves 34. That is, instead of having continuous annular grooves 26, as illustrated in FIGURES 2–4, the grooves 34 of the alternative embodiment are established in segmented fashion. The segmented grooves 34 of the alternative roller embodiment are also radially staggered in terms of distance from the axial center of the roller. Also, inner ends 35 of the segmented grooves 34 are positioned at a depth sufficient to permit overlapping of the grooves within the disc portion 23 of the roller 8, see FIGURE 6. Note also that the center angles subtended by the opposite grooves overlap one another.

The caster type roller of this invention is preferably formed from a plastic material. A particularly preferred plastic material found useful in manufacturing such wheels is polyurethane. Polyurethanes have been found to be most useful because polyurethane elastomer compositions may be varied, as desired, to provide dense plastic materials with high hardness values. Such high hardness values provide the good wearability and long useful life characteristics inherent in the roller structure of this invention. The groove 26, 34 geometry in the disc portion 23 of the rollers 8 provides the softness of ride. It is particularly preferred, that a polyurethane elastomer having a Short D hardness value above about 55 be used in manufacturing the roller structure of this invention.

Although the roller structure of this invention has been described with relation to a caster type roller, it will be appreciated that by forming teeth around the outer diameter or tread of the roller, and by using a drive bearing 17, the roller structure can be used as a driver or sprocket in applications that involve shock and vibrational stresses.

What I desire to claim and protect by Letters Patent is:

1. A roller comprising:
   a tread,
   a hub, and
   a disc portion positioned between said tread and said hub, said disc portion having opposite side surfaces and being substantially solid, and
   at least one groove extending inwardly from each side surface of said disc toward the other side surface thereof, said grooves being radially staggered and the inner ends of said grooves axially overlapping.

2. A roller as set forth in claim 1 wherein said grooves extend parallel to the axis of said wheel.

3. A roller as set forth in claim 1 wherein said grooves are annular.

4. A roller as set forth in claim 3 wherein said annular grooves are continuous.

5. A roller as set forth in claim 3 wherein said annular grooves are segmented.

6. A roller as set forth in claim 1 wherein said hub, said disc portion, and said tread are formed as an integral molding.

7. A roller as set forth in claim 1 wherein said disc portion is substantially as wide as said tread.

8. A roller as set forth in claim 1 wherein said wheel is fabricated from a plastic material.

9. A roller as set forth in claim 8 wherein said plastic material is a polyurethane.

10. A roller as set forth in claim 9 wherein said polyurethane has a Shore D hardness value above about 55.

References Cited

UNITED STATES PATENTS

| 330,339 | 11/1885 | Lucas | 16—107 |
| 439,112 | 10/1890 | Clark | 16—107 |
| 2,161,210 | 6/1939 | Waalkes | 308—190 |
| 2,530,665 | 11/1950 | Searles | 308—190 |
| 3,072,169 | 1/1963 | Hastings | 16—107 X |

FOREIGN PATENTS

| 1,345,005 | 10/1963 | France. |

DONALD A. GRIFFIN, *Primary Examiner.*